United States Patent
Dubey

(10) Patent No.: US 10,281,317 B2
(45) Date of Patent: May 7, 2019

(54) BOTTLE FOR ACCURATELY MONITORING FLUID INTAKE

(71) Applicant: Dilan Dubey, Troy, MI (US)

(72) Inventor: Dilan Dubey, Troy, MI (US)

( * ) Notice: Subject to any disclaimer, the term of this patent is extended or adjusted under 35 U.S.C. 154(b) by 342 days.

(21) Appl. No.: 14/974,557

(22) Filed: Dec. 18, 2015

(65) Prior Publication Data
US 2017/0176238 A1  Jun. 22, 2017

(51) Int. Cl.
| | | |
|---|---|---|
| *G01F 23/20* | (2006.01) | |
| *G01G 17/04* | (2006.01) | |
| *A47G 23/16* | (2006.01) | |
| *A47G 19/22* | (2006.01) | |
| *G01G 17/06* | (2006.01) | |
| *G01F 9/00* | (2006.01) | |

(52) U.S. Cl.
CPC ......... *G01G 17/04* (2013.01); *A47G 19/2227* (2013.01); *A47G 23/16* (2013.01); *G01F 9/003* (2013.01); *G01G 17/06* (2013.01); *A47G 2200/226* (2013.01)

(58) Field of Classification Search
CPC . G01F 23/20; G01G 17/04; F17C 2201/0109; F17C 2201/032; F17C 2223/033; A47G 19/2227; A47G 23/16; B65D 51/24
USPC .......................................................... 73/296
See application file for complete search history.

(56) References Cited

U.S. PATENT DOCUMENTS

| | | | | |
|---|---|---|---|---|
| 2,015,689 A | * | 10/1935 | Odell | G01F 23/20 137/551 |
| 5,837,944 A | * | 11/1998 | Herot | G01K 1/14 177/245 |
| 6,644,344 B2 | * | 11/2003 | Tibbott | G01F 1/76 137/2 |
| 6,732,580 B2 | * | 5/2004 | Dirksen | G01F 23/0023 73/149 |
| 8,141,420 B2 | * | 3/2012 | Hirao | A61B 5/208 73/198 |
| 2005/0040128 A1 | * | 2/2005 | Kong | A61J 9/001 215/11.3 |
| 2006/0260393 A1 | * | 11/2006 | Takano | G01F 23/20 73/296 |
| 2007/0056368 A1 | * | 3/2007 | Schneiter | G01F 23/20 73/296 |
| 2012/0048149 A1 | * | 3/2012 | Pendleton | A47G 23/0641 108/13 |

(Continued)

FOREIGN PATENT DOCUMENTS

CN   203646712 U   6/2014

OTHER PUBLICATIONS

Amy Schlinger, BluFit: A Smart Water Bottle That Monitors Hydration, "http://dailyburn.com/life/tech/blufit-water-bottle-app-preview/".

(Continued)

*Primary Examiner* — Natalie Huls
*Assistant Examiner* — Mohammed E Keramet-Amircolai
(74) *Attorney, Agent, or Firm* — Carlson, Gaskey & Olds, P.C.

(57) ABSTRACT

A bottle according to an exemplary aspect of the present disclosure includes, among other things, a sidewall, at least one cap removably attached to the sidewall, and a control unit. The control unit is configured to determine whether fluid expelled from the bottle is consumed by a user.

17 Claims, 3 Drawing Sheets

(56) References Cited

U.S. PATENT DOCUMENTS

| | | | | |
|---|---|---|---|---|
| 2012/0097567 A1* | 4/2012 | Zhao | ............ | A47G 23/16 |
| | | | | 206/459.1 |
| 2013/0319915 A1* | 12/2013 | Gellibolian | ............ | C02F 1/002 |
| | | | | 210/87 |
| 2014/0311239 A1* | 10/2014 | Marjanovic | ............ | G01F 23/20 |
| | | | | 73/296 |
| 2015/0253173 A1* | 9/2015 | Cedulf | ............ | G01F 23/20 |
| | | | | 73/296 |
| 2017/0094721 A1* | 3/2017 | Moore | ............ | H05B 1/0252 |

OTHER PUBLICATIONS

BluFit Smart Water Bottle, "http://oddity mall.com/bluefit-smart-water-bottle".
Mike Hanlon, The Hydracoach Intelligent Waterbottle, "http://www.gizmag.com/go/6137/".
SmartBottle, "http://www.sarahpease.com/SmartBottle".

\* cited by examiner

BOTTLE FOR ACCURATELY MONITORING FLUID INTAKE

BACKGROUND

Bottles for drinking fluid, such as water, typically include a base, a sidewall, and an open mouth. The mouth is typically threaded and receives a cap, which may include a nozzle. In today's marketplace, consumers have become increasingly interested in "smart" devices able to track the user's activity and other metrics. Some known "smart" water bottles attempt to track the quantity of water consumed by a user over a period of time.

"Smart" water bottles are known to include a flow meter incorporated into a cap of the bottle. The flow meter communicates with a user's computing device, such as a mobile phone. A software application on the user's computing device tracks the quantity of water consumed by the user.

SUMMARY

A bottle according to an exemplary aspect of the present disclosure includes, among other things, a sidewall, at least one cap removably attached to the sidewall, and a control unit. The control unit is configured to distinguish between (1) fluid expelled from the bottle that is consumed by a user and (2) fluid expelled from the bottle without being consumed by the user.

A method according to another exemplary aspect of the present disclosure includes, among other things, filling a bottle with an amount of fluid. The bottle includes at least one cap removably attached to a sidewall, and a control unit. The method further includes the step of distinguishing, using the control unit, between (1) fluid expelled from the bottle that is consumed by a user and (2) fluid expelled from the bottle without being consumed by the user.

A system according to yet another exemplary aspect of the present disclosure includes, among other things, a bottle including a sidewall having first and second ends, a first cap removably attached to the first end of the sidewall, a second cap removably attached to the second end of the sidewall, and a control unit. The control unit is configured to distinguish between (1) fluid expelled from the bottle that is consumed by a user and (2) fluid expelled from the bottle without being consumed by the user. The system further includes a computing device remote from the bottle. The computing device is configured to receive information from the bottle by one of a wired and a wireless connection, and is further configured to store and analyze information received from the bottle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
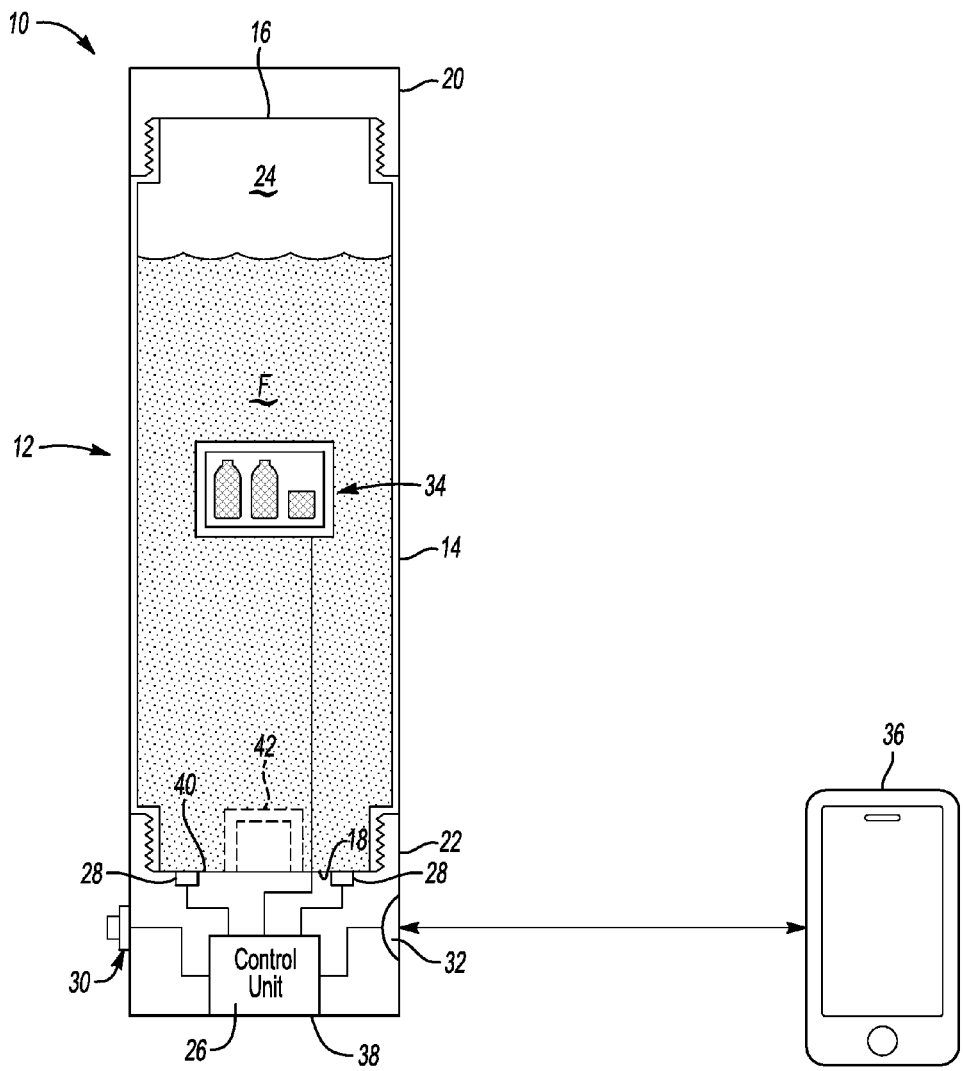
FIG. 1 illustrates an example system including a bottle.

FIG. 1 illustrates an example system 10 including a bottle 12. Bottles such as the bottle 12 are often generically referred to as "water bottles." However, the bottle 12 may be used to contain any type of fluid, including, for example, water, tea, and sports drinks.

In this example, the bottle 12 includes a sidewall 14 having a first end 16 and a second end 18 opposite the first end 16. The sidewall 14 is generally tubular in this example. The bottle 12 further includes a first cap 20 removably attached to the first end 16 of the sidewall 14. In this example, the first cap 20 is threadably engaged with the first end 16 of the sidewall 14. The bottle 12 further includes a second cap 22 removably attached to the second 18 of the sidewall 14. Like the first cap 20, the second cap 22 is threadably engaged with the second end 18.

Although threaded connections are shown, it should be understood that the first and second caps 20, 22 could be connected to the first and second ends 16, 18 in other ways. Additionally, the first and second caps 20, 22 could be color coded to allow a user to distinguish between the two. As discussed below, the first cap 20 may be intended as the cap to be removed for consumption, whereas the second cap 22 may be intended as the cap to be removed for cleaning. Color coding the caps 20, 22 easily allows a user to distinguish between the two. Further, the first and second caps 20, 22 may be wide-mouth caps to allow for easy cleaning and dispensing of fluid. In this example, the first and second caps 20, 22 do not include nozzles.

When attached to the first and second ends 16, 18, the first and second caps 20, 22 are configured to enclose an interior space 24 of the bottle 12. The interior space of the bottle 12 is configured to store a fluid F. In FIG. 1, the interior space 24 is partially filled with the fluid F. As mentioned above, the fluid F may be water, however this disclosure is not limited is not limited to any particular fluid F.

In this example, the second cap 22 contains a control unit 26. The control unit 26 can be incorporated into the first cap 20 in other examples. The control unit 26 may be any known type of control unit, including memory, hardware, and software. The cap 22 further includes at least one weight sensor 28 (two weight sensors 28 are illustrated) electrically coupled to the control unit 26. The control unit 26 is further coupled to an interrupt button 30, an input/output port 32, and, optionally, a display 34, such as a liquid crystal display (LCD) screen. The control unit 26 may further be coupled to sensors (not illustrated) the detect whether the first or second caps 20, 22 are open.

In FIG. 1, the control unit 26 is electrically coupled to a remote device via the input/output port 32. In this example, the remote device is an external computing device 36, such as a mobile phone, tablet, personal computer, a wearable device (such as a Fitbit® or similar device), or laptop. The remote device may also be a charger configured to charge a battery powering the control unit 26 and/or the display 34, for example.

In this example, the display 34 is incorporated into the sidewall 14, while the interrupt button 30 and the input/output port 32 are incorporated into the second cap 22. The display 34, however, could be incorporated into the second cap 22 as well. Alternatively, in some examples, the bottle 12 does not include a display.

The control unit 26 is configured to receive signals from the weight sensors 28 and the interrupt button 30. The control unit 26 is further configured to interpret the received signals, and relay them to the display 34, or to the external computing device 36. In one example, the control unit 26 relays information to the external computing device 36 wirelessly, such as over a wireless network or a Bluetooth connection. The external computing device 36 may also be connected to the input/output port 32 by way of a wired connection.

In this example, and as illustrated in FIG. 1, the first cap 20 is a top cap for the bottle 12. The first cap 20 is intended to be used as the cap that a user would remove from the sidewall 14 in order to consume the fluid F within the bottle 12. The second cap 22, on the other hand, is a bottom cap. During normal drinking, the bottle cap 22 is intended to remain attached to the sidewall 14.

In this example, the weight sensors 28 are incorporated into an upper surface 40 generally opposite a base 38 of the second cap 22. The weight sensors 28 are in direct contact with the fluid F in this example. When the bottle 12 is in the upright position (of FIG. 1), the weight of the fluid F falls on the upper surface 40 and on the weight sensors 28.

Figure 2:
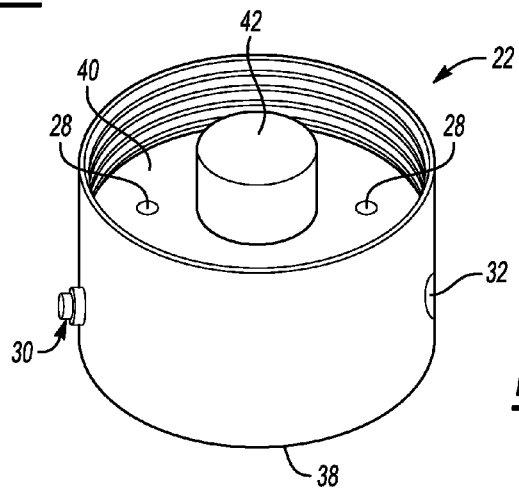
FIG. 2 is a perspective view of an example cap.

Optionally, a reusable ice cube 42 projects into the interior space 24 of the bottle 12 from the upper surface 40, as perhaps best seen in FIG. 2. The reusable ice cube 42 is a sealed plastic vessel including a fluid such as water, for example. The reusable ice cube 42 is removably attached to the upper surface 40, and can be used to cool the fluid F within the interior space 24. While shown relative to the second cap 22, the reusable ice cube 42 could be incorporated into the sidewall 14 or the first cap 20.

The external computing device 36 may be configured to run a software application that tracks a user's fluid consumption over a period of time, and more generally to store and analyze information received from the bottle 12. The software application can also make recommendations to the user regarding the amount of fluid that it should consume throughout a day, for example. Additionally, the software application can be in communication with other applications linked to the computing device 36, such as heart rate monitors or workout applications, to adjust the user's recommended fluid intake.

Alternatively, the bottle 12 can function without an associated external computing device 36. In that case, the control unit 26 essentially functions as the computing device, and the display 34 is used to convey information regarding fluid consumption to the user. The display 34 can also display messages to the user regarding the recommended amount of fluid for consumption throughout the day, for example.

Figure 3:
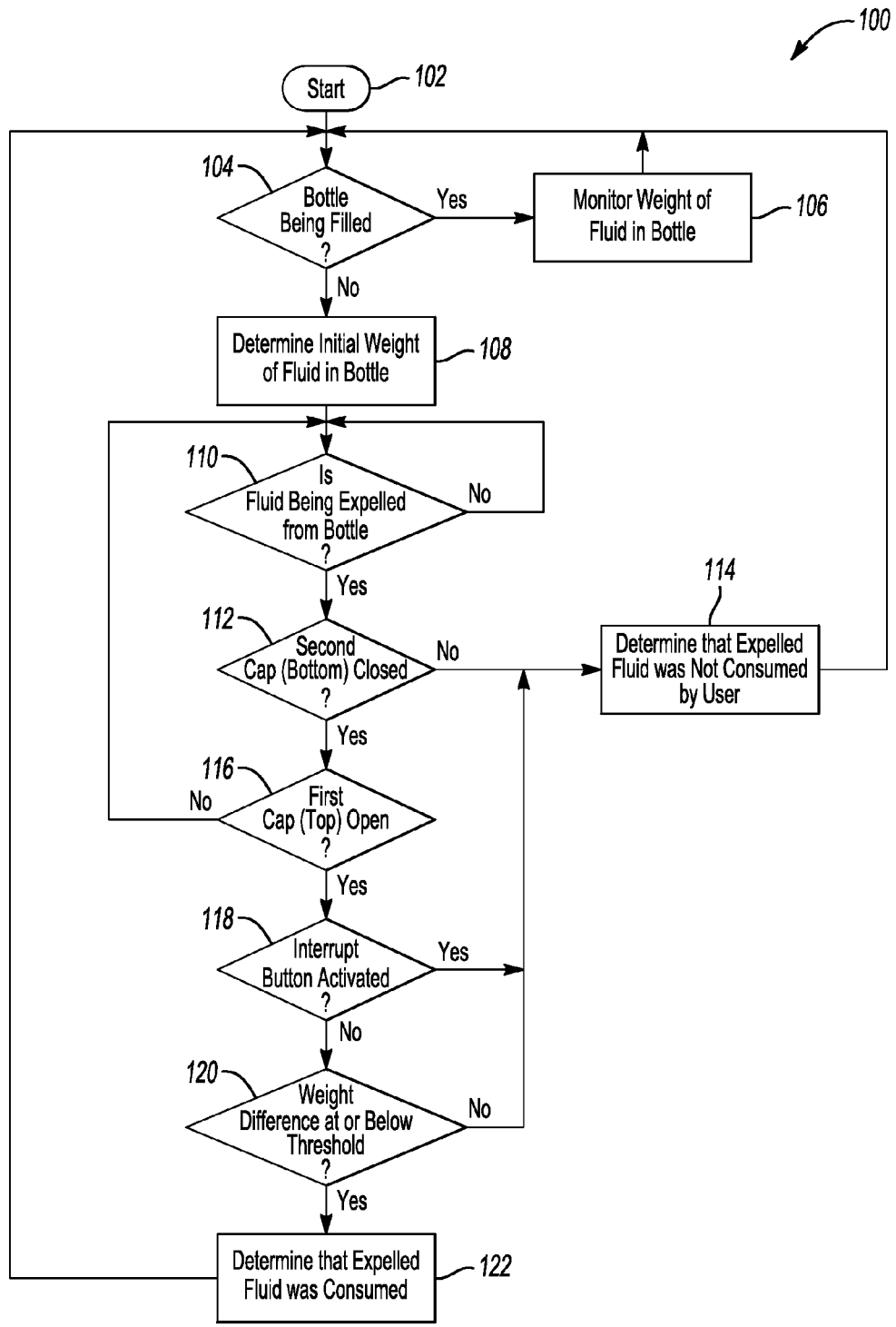
FIG. 3 is a flowchart representing a first aspect of an example method.

FIG. 3 illustrates an example method 100 according to this disclosure. Beginning at 102, the control unit 26 interprets signals from the weight sensors 28 to determine whether the bottle 12 is being filled with a fluid F at 104. If so, at 106 the control unit 26 uses the weight sensors 28 to continue monitoring the weight of fluid F in the bottle 12. When the weight stops increasing, at 108, a control unit 26 determines the initial weight of fluid F in the bottle 12.

At 110, the control unit 26 continually monitors signals from the weight sensors 28 to determine whether fluid is being expelled from the bottle via the first cap 20 or the second cap 22. At 112, the control unit 26 determines whether the second cap 22 is closed.

If the second cap 22 is open, the control unit 26 determines, at 114, that the expelled fluid was not consumed by the user. Typically, the user will use the second cap 22 to discard unwanted fluid F, or to rinse the interior space 24 for cleaning.

If the second cap 22 is closed, the control unit then determines, at 116, whether the first cap 20 is open. If not, the control unit 26 continually monitors for whether the caps are open, and whether there is a weight change detected by the sensors 28 (e.g., back to step 110). Alternatively, if the bottle does not include sensors configured to detect whether the first and second caps 20, 22 are open/closed, the control unit 26 could determine that either the first cap 20 or the second cap 22 was open based on the rate of change of fluid weight relative to a predetermined threshold value.

Continuing with the method 110, if the first cap 20 is open, the control unit 26 detects, at 118, whether the interrupt button 30 is activated. If so, the control unit 26 determines that the expelled fluid is not consumed by the user. The interrupt button 30, in this regard, works as a "pause" or an "override" to the normal function of the control unit 26.

When the interrupt button 30 is not activated, the fluid F expelled from the bottle 12 may be fluid F that the user is consuming. At 120, however, there is another check to determine whether the user is discarding (i.e., dumping out or spilling) the fluid F from the first cap 20 without consuming it. The act of "dumping out" or spilling the fluid F would be detected by a relatively large change in weight in a relatively short time.

At 120, the control unit 26 determines whether a weight difference, relative to a predetermined time period (such as 5 seconds, 1 second, or 0.5 seconds), is at or below a predetermined threshold. If so, the control unit 26 determines, at 122, that the user has consumed the fluid F. If not, the control unit 26 determines, essentially, that the fluid was dispelled too quickly to have been consumed by the user.

Figure 4:
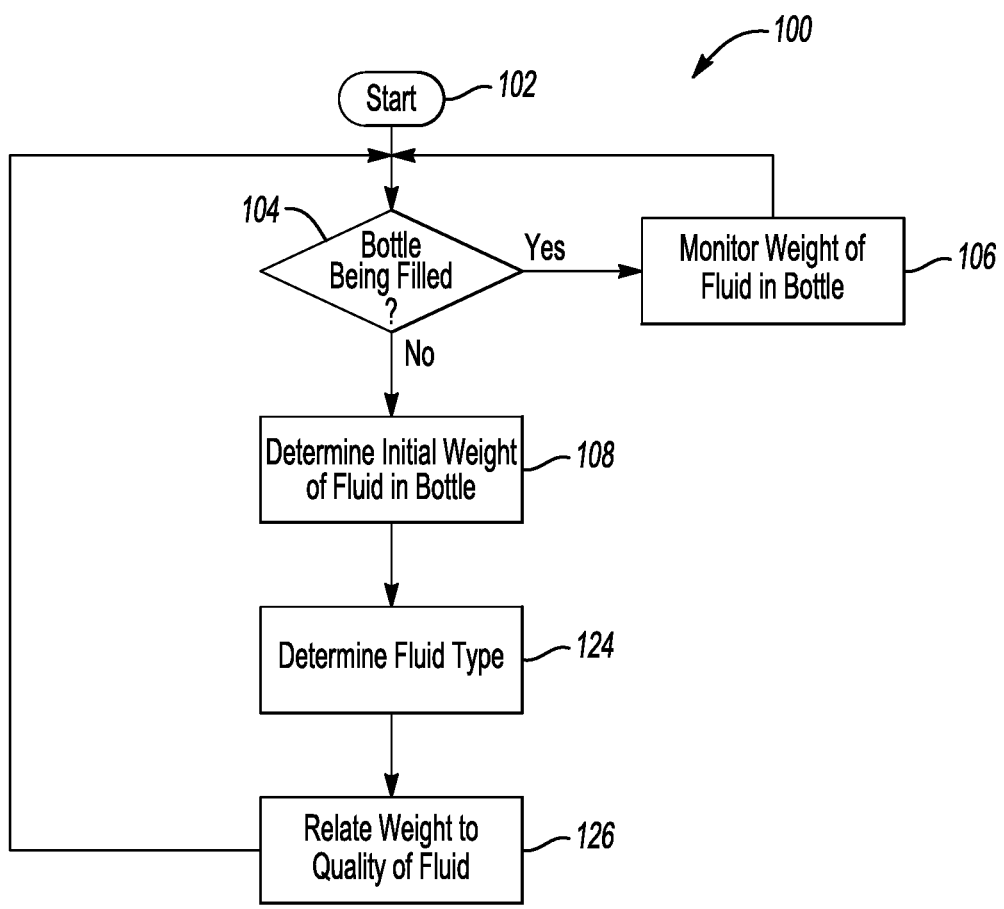
FIG. 4 is a flowchart representing a second aspect of the example method.

FIG. 4 is a flow chart representative of a second aspect of the method 100 according to this disclosure. This second aspect of the method 100 is optional, and can function (when present) in parallel with the first aspect of the method 100 (discussed relative to FIG. 3).

In the second aspect of FIG. 4, after the initial weight of fluid F in the bottle 12 is determined at 108, the type of fluid is determined by the control unit 26, at 124. The fluid type could be input by a user via the external computing device 36, or by way of some other input. Depending on the type of fluid F, the weight of the fluid F can be related to fluid quality, at 126, by the control unit 26 using a look-up table, for example. For instance, if the fluid F is water, and the weight exceeds a predetermined threshold corresponding to the interior space 24, the user can be alerted (via the display 34, for example) that the water may be filled with an increased level of sediments or other contaminants, for example.

Among other things, this disclosure provides a reliable and efficient way for a user to accurately monitor the amount of fluid consumed over a given time period. The disclosed bottle is configured to accurately distinguish between fluid that is consumed (i.e., intake) by a user versus fluid that is discarded (i.e., not consumed). Distinguishing discarded fluid from consumed fluid increases the accuracy of the fluid measurement provided by the disclosed bottle. Further, the disclosed bottle 12 functions automatically without being actively triggered. That is, a user is not required to activate a "counter" button to indicate that it is consuming fluid. Additionally, providing the user with the amount of discarded fluid may be serve as a reminder to the user to curb the user's habits relative to the fluids that they intend to consume, which may result in less fluid waste. The disclosed bottle can also be used to monitor the fluid intake of another individual. For instance, a parent can monitor their child's fluid intake, a doctor/nurse can monitor their patient's fluid intake, or a coach/trainer can monitor their players' fluid intake.

It should be understood that the control unit 26 and associated components (such as the display and various sensors) could be sold as a stand-alone unit separate from the bottle 12. Further, the bottle 12 could be a standard, generic type of water bottle, such as a single use water bottle. In that case, the stand-alone unit containing the control unit 26 would be configured to operate with a standard water bottle. Alternatively, the bottle 12 and control unit 26 (and associated components) could be sold together as an integrated system (such as the system 10).

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A bottle, comprising:
    a sidewall;
    at least one cap removably attached to the sidewall;
    a weight sensor coupled to one of either the cap and the sidewall; and
    a control unit electrically coupled to the weight sensor, the control unit configured to interpret signals from the weight sensor to determine whether (1) fluid expelled from the bottle is consumed by a user or (2) fluid is expelled from the bottle without being consumed by the user.

2. The bottle as recited in claim 1, wherein the control unit determines, in response to signals from the weight sensor, a rate of change in the weight of the fluid within the bottle relative to time and compares the rate of change to a predetermined threshold.

3. The bottle as recited in claim 2, wherein, when the rate of change is at or below the predetermined threshold, the control unit determines that the fluid expelled from the bottle is consumed by the user.

4. The bottle as recited in claim 1, wherein the control unit is configured to interpret signals from the weight sensor to determine a quality of the fluid within the bottle.

5. The bottle as recited in claim 1, further comprising:
    a first cap removably attached to a first end of the sidewall; and
    a second cap removably attached to a second end of the sidewall.

6. The bottle as recited in claim 5, wherein the control unit is incorporated into the second cap.

7. The bottle as recited in claim 6, wherein the first cap is a wide mouth bottle cap without a nozzle.

8. The bottle as recited in claim 6, wherein the second cap includes an electrical port to electrically couple the control unit to a remote device.

9. The bottle as recited in claim 8, wherein the remote device is one of an external computing device and a charger.

10. The bottle as recited in claim 5, further comprising a reusable ice cube removably attached to one of the sidewall, the first cap, and the second cap.

11. The bottle as recited in claim 1, wherein the bottle includes an interrupt button, and wherein, when the interrupt button is activated, the control unit does not consider fluid expelled from the bottle to be consumed by the user.

12. The bottle as recited in claim 11, wherein the interrupt button is incorporated into the at least one cap.

13. The bottle as recited in claim 1, further comprising a display screen mounted to the bottle, the display screen electrically coupled to the control unit and configured to display an amount of fluid consumed by the user.

14. A method, comprising: filling a bottle with an amount of fluid, the bottle including at least one cap removably attached to a sidewall of the bottle, a weight sensor coupled to one of either the cap and the sidewall, and a control unit electrically coupled to the weight sensor; and using the control unit, interpreting signals from the weight sensor to determine whether (1) fluid expelled from the bottle is consumed by a user or (2) fluid is expelled from the bottle without being consumed by the user.

15. The method as recited in claim 14, wherein, during activation of an interrupt button of the bottle, the control unit does not consider fluid expelled from the bottle to be consumed by the user.

16. A system, comprising: a bottle including a sidewall having first and second ends, a first cap removably attached to the first end of the sidewall, a second cap removably attached to the second end of the sidewall, a weight sensor coupled to one of any of the cans and the sidewall, and a control unit electrically coupled to the weight sensor: the control unit configured to interpret signals from the weight sensor to determine whether (1) fluid expelled from the bottle is consumed by a user or (2) fluid is expelled from the bottle without being consumed by the user; and a computing device remote from the bottle, the computing device configured to receive information from the bottle by one of a wired and a wireless connection, the computing device further configured to store and analyze information received from the bottle.

17. The system as recited in claim 16, wherein the computing device is one of a personal computer, a laptop, a tablet, a wearable device, and a mobile phone.

* * * * *